US008551243B2

(12) United States Patent
Soto Montoya et al.

(10) Patent No.: US 8,551,243 B2
(45) Date of Patent: Oct. 8, 2013

(54) CONCRETE REINFORCED WITH HYBRID NANOMATERIALS

(75) Inventors: Jose Antonio Soto Montoya, Corre idora (MX); Mauricio Martinez Alanis, Corregidora (MX); Mauricio Terrones Maldonado, Coyoacan (MX); Humberto Terrones Maldonado, San Luis Potosi (MX); Daniel Ramirez Gonzalez, San Luis Potosi (MX)

(73) Assignee: Urbanizaciones Imoboliarias del Centro S.A. de C.V., Session Queretaro (MX)

( * ) Notice: Subject to any disclaimer, the term of this patent is extended or adjusted under 35 U.S.C. 154(b) by 0 days.

(21) Appl. No.: 13/515,134

(22) PCT Filed: Dec. 13, 2010
(Under 37 CFR 1.47)

(86) PCT No.: PCT/MX2010/000153
§ 371 (c)(1),
(2), (4) Date: Jan. 29, 2013

(87) PCT Pub. No.: WO2011/074930
PCT Pub. Date: Jun. 23, 2011

(65) Prior Publication Data
US 2013/0199417 A1 Aug. 8, 2013

(30) Foreign Application Priority Data

Dec. 17, 2009 (MX) .................... MX/a/2009/013931

(51) Int. Cl.
| | |
|---|---|
| C04B 16/12 | (2006.01) |
| C04B 28/00 | (2006.01) |
| C04B 7/02 | (2006.01) |
| C04B 14/38 | (2006.01) |
| C01B 31/02 | (2006.01) |

(52) U.S. Cl.
USPC ........... 106/717; 106/724; 106/802; 106/814; 977/745; 977/746; 977/748; 977/749; 977/752

(58) Field of Classification Search
USPC .......... 106/717, 724, 802, 814; 977/745, 746, 977/748, 749, 752
See application file for complete search history.

(56) References Cited

U.S. PATENT DOCUMENTS

| | | | |
|---|---|---|---|
| 7,740,825 B2 * | 6/2010 | Tohji et al. | ................. 423/447.1 |
| 2007/0209093 A1 * | 9/2007 | Tohji et al. | .................... 977/840 |
| 2009/0229494 A1 | 9/2009 | Shah et al. | |

FOREIGN PATENT DOCUMENTS

EP 2 228 343 A1 9/2010

OTHER PUBLICATIONS

Derwent-Acc-No. 2009-N97202, abstract of Russian Patent Specification No. RU 2360891 C1 (Jul. 2009).*
Derwent-Acc-No. 2010-K47534, abstract of Russian Patent Specification No. RU 2397069 C1 (Aug. 2010).*
Derwent-Acc-No. 2011-G56232, abstract of Russian Patent Specification No. RU 2420472 C1 (Jun. 2011).*
Derwent-Acc-No. 2011-H30500, abstract of Russian Patent Specification No. RU 2422408 C1 (Jun. 2011).*
Derwent-Acc-No. 20011-N93692, abstract of Russian Patent Specification No. RU 2433038 C1 (Nov. 2011).*
Han et al., Effects of CNT Doping Level and Water/Cement Ratio on the Piezoresistivity of CNTS/Cement Composites, ASME 2010 Conference on Smart Materials, Sep. 28-Oct. 1, 2010.
Cwirzen et al., Surface decoration of carbon nanotubes and mechanical properties of cement/carbon nanotube composites, Advances in Cement Research, 2008, vol. 20, No. 2.
Luo et al., Flexxural strengths and characteristics of cement-based composite reinforced with acid-treated multi-walled carbon nanotubes, Journal, 2008.
Sanchez et al., Nanotechnology in Concrete—A Review, Construction and Building Materials, 2010.
Musso et al., Influence of carbon nanotubes structure on the mechanical behavior of cement composites, Composites Science and Technology, May 2009.
Li et al., Mechanical behavior and microstructure of cement composites incorporating surface-treated multi-walled carbon nanotubes, Carbon, 2005.
Yu et al., A carbon nanotube/cement comosite with piezoresistive properties, Smart Materials and Structures,Mar. 30, 2009.
International Search Report and English translation, PCT/MX2010/000153, dated Jun. 1, 2011.

* cited by examiner

*Primary Examiner* — Anthony J Green
(74) *Attorney, Agent, or Firm* — Cook Alex Ltd.

(57) ABSTRACT

Concrete reinforced with nanostructures and reinforcing concrete methods are provided having cement and dispersion including water, a surfactant, carbon nanotubes having on the external surfaces thereof carbon atoms substituted by atoms of another element or other elements, and carbon nanotubes possessing chemical groups on the surface thereof.

13 Claims, 7 Drawing Sheets

X RAY diffraction Pattern

Functionalized CNT 0.01 %

Functionalized CNT

Functionalized CNT

CONCRETE REINFORCED WITH HYBRID NANOMATERIALS

FIELD OF THE INVENTION

The instant invention is related to reinforced concretes, and particularly to concrete reinforced with nanostructured materials.

BACKGROUND OF THE INVENTION

In the construction industry there is a composite material generally used, a paste-type material comprising other materials to gain volume and that has excellent mechanical properties, this material is concrete. Through history, concrete has been undergoing important modifications ranging from masonry binding to be a principal element in constructions of slim or thin-walled and resistant or strain and stress resistant structures, such as reinforced concrete.

Concrete has different classifications primarily based on its ability to resist strains and stress or strength under compression and the time required to acquire such strength (set or dry). In this manner, normal resistance concrete and high-resistance or fast-resistance concrete can be obtained. It is important to mention that there is a national and international industry that has generated diverse material to be combined with concrete in order it to acquire new properties. These materials are known as additives, fluidizers, die retardants, waterproofing agents, air fillers and strain-reinforcing fibers. In other words, concrete is a mixture that can accept a number of external agents (additives) without detriment of its main feature (compressive strength) and with a gain in its original properties.

On the other hand, the interest in developing composite materials has been increased in recent years, combining two or more components and which properties allow their use in diverse areas. More recently, the interest in using nanometer-scale materials for manufacturing nanocompounds with improved properties has been increased. Carbon nanotubes are excellent candidates for manufacturing nanocompounds as these can be 100 times more strength than steel but six times lighter than this.

An example of the above is the document WO2009/099640 that discloses a method for manufacturing composite materials comprising cement reinforced with dispersed carbon nanotubes, by applying ultrasonic energy and using a surfactant to form a fluid dispersion of carbon nanotubes and mixing the dispersion with cement such that carbon nanotubes can be well dispersed in the cementitious matrix.

Also, document US2008/0134942 discloses the use of carbon nanotubes in cement composites, wherein cement, aggregated material, carbon nanotubes and plasticizer are used.

Within the different carbon nanotube types, there are single-wall structures and multiple-wall structures, besides a differentiation according to elements to be bound to nanotube walls by means of physical and/or chemical treatments. For example, carbon atoms can be replaced by different elements in the walls. Among these are nitrogen, phosphorus, potassium, silicon, oxygen, boron, etc. Additionally, there is a possibility to have covalent groups covalently bound to nanotube walls, particularly methyl, carbonyl, hydroxyl groups, etc. The modification of tube surface either by doping or functionalizing increases surface reactivity thereof, which is essential to create strong interactions among nanotubes and matrixes in question such as cement or concrete.

SUMMARY

Considering that nanostructures are able to transfer bulk properties to the concrete matrix when mixing correctly, homogeneously and at an adequate rate, and that hydraulic concrete of cement-water plus aggregates may accept external agents, it has been determined to be possible to generate a new family of nanostructured cements with improved mechanical properties by adding minimal amounts of nanomaterials (e.g. 0.1-10% by weight). In this regard, it is important to mention that the works of Matthew Brenner on the mixing of reinforced carbon nanofibers with carbon nanotubes (purer) in cement and concrete, wherein increments in compression strength of samples having these mixtures with respect to those lacking of additive are reported.

None of the above mentioned documents used doped or functionalized multiple-walled carbon nanotubes that importantly increase the load transference of tubes to concrete due to the doping or functionalized sites of nanotubes.

In general, concrete can be considered as a series of bound spores believed to give the compound a high strength since they are "urchin"-like inter-bound, such structure being considered to handle better the strength. As the urchins are not inter-bound by their points and they separate under stress. The present invention is related to the integration of such crystalline structures catalyzing the same in the wall of our tubes. Upon doping such nanotubes they become more reactive allowing such a binding, binding so the spores with a similar size element such as the nanotube, obtaining in this manner a double effect, upon compression the tubes binding spore to spore act as a containment, increasing their compressive strength, and upon stress the tube acts as a tensor between spores growing in its surface.

By "hybrid" materials according to the present invention, is meant the inclusion of doped nanotubes (bamboo type), nanobars of SiOx and nanoplates (or nanoflakes of SiOx, AlOx).

It is important to mention that the use of doped nanotubes and particularly nitrogen-doped nanotubes, when mixing with concrete, promote the growth of nanostructures of SiOx (flakes and bars) increasing by two the concrete mechanical properties. When nitrogen-doped nanotubes are not added but other nanotubes (such as those of the above cited documents, wherein materials that are not nitrogen-doped are used) are added, these new structures of SiOx and AlOx NO interact with nanotubes. Therefore, the combination of nitrogen-doped nanotubes, SiOx and AlOx flakes and SiOx nanobars forms a new hybrid nanomaterial which is more resistant within the concrete.

In the state of art the tubes have perfect crystalline nets but the inventive doping generates imperfections in the tubes, therefore the graphitic net is not perfect.

Firstly: the term "doped tubes" is applicable to a substitution of elements in the arrangement of a non-perfect graphitic net, wherein three types of doping are:

Type I: carbon atom substitution (with any atom available) in the graphitic net with no vacancy.

Type II: carbon atom substitution (with any atom available) in the graphitic net with vacancy.

Type III: carbon atom substitutions (with hydrogen —H, or carbonyl or carboxyl groups —COH or COOH) with sites having general vacancy.

In all cases, "x" ranges from 0.1 to 10% at (atomic percent), x=H, N, P, OX, S, Si, Se, B . . . carbonyl, carboxyl groups, including any combination or permutations.

Second: In addition to the doping, the tube dimensions and also the aspect ratio are different with respect to the art or works previously referred to.

Third: in the described nanostructured concrete of the invention, combinations of nanomaterials are given but reinforce mechanisms are different:

1. With multiple wall or multilayer nanotubes (MWNT'S), with an imperfect graphitic net, having diminished Type III doping (<2-3% at), and a lower reactivity with oxygen: No different nano-structures are present compared to those added (that is, the nanotubes), the moderated increment in strength is due to the nanotubes and their distribution within material.
2. With COx, having an imperfect net with Type III doping (3-5% at) and a moderated reactivity with oxygen: Neither nanostructures of SiOx or AlOx are present upon adding nanotubes, the moderated increment in strength is due to the presence of nanotubes and its distribution in the material.
3. With CNx, having an imperfect net with Type I and II doping (0.1-10% at), with high reactivity to oxygen: A hybrid nanostructures arrangement consisting in nanofibers and nanoplates of SiOx and AlOx is present, with the presence of CNx. Due to its high reactivity, the SiOx and AlOx structures are catalyzed by tubes of CNx, and the result is not only a mixture of nanotubes and cement with water, but CNx nanotubes are catalyzed during the mixing of cement and water by means of an exothermic reaction forming nanofibers and nanoplates of SiOx and AlOx, creating a modification in nanometric structure of concrete that has not been previously reported.

Fourth: The carbon nanotubes that perform better are those that are N-doped, and their structure is bamboo-type and this is not disclosed in any of the prior art patents and, in fact, they are not exactly tubes themselves based in their physical structure.

The applications of a concrete manufactured according to the present invention are as wide as the use of concrete itself in these days. For example, its use in the construction industry is not limited to a particular sector, encompassing small projects to the greatest civil constructions such as dams, power stations, communication paths, and complex buildings with great size and volume. It is useful in also the housing sector wherein applicability of this material is of great importance for the following reasons:

- As the inventive concrete has greater strength than the usual concrete, less amounts of concrete are required for the construction of housing structural elements, and therefore more habitable area is available.
- As the structural elements involved have less thickness, the relative weight of such elements is also less; therefore, the handling of same is simplified and less personnel or labor is required for handling thereof.
- As the structural elements are lighter and more easily handled, their manufacturing is simplified in controlled environments for pre-manufacturing a structure, allowing the industrialization of concrete pre-manufactured houses.
- By diminishing the amount of cement used, the ecology is preserved as a ton of cement produced is equivalent to a ton of $CO_2$ produced.
- Decorative elements of any type of facades will require less thickness to support pressures caused by winds and their usual strength demands, and therefore it means a lower weight of the main structure saving in this manner the basement costs of structure.

ASPECTS OF THE INVENTION

Therefore, an object or aspect of the invention is to provide a reinforced concrete, characterized by comprising cement and a dispersion including water, a surfactant, multilayer carbon nanotubes wherein carbon atoms in their external walls are substituted by atoms of another element and multilayer carbon nanotubes having chemical groups in their surface.

In addition, another object or aspect of the invention is to provide a method for reinforcing concrete, comprising the steps of forming a surfactant dispersion, multilayer carbon nanotubes having carbon atoms in their external walls substituted by atoms of another element and multilayer carbon nanotubes having on their surface chemical groups; and mixing the dispersion with cement to form reinforced concrete.

BRIEF DESCRIPTION OF THE FIGURES

For a better understanding of the invention, a disclosure thereof is provided below along with drawings accompanying the same, wherein.

DETAILED DESCRIPTION OF THE INVENTION

Figure 1A:
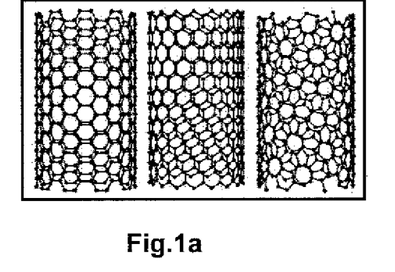
FIG. 1a is a schematic illustration showing carbon nanotube models with different orientations of the hexagons.
Figure 1B:
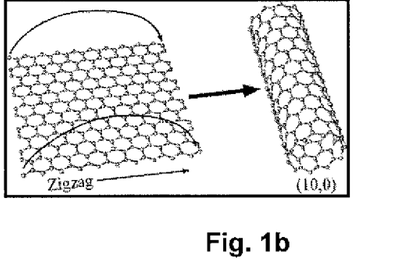
FIG. 1b is a schematic illustration of a graphene sheet and a nanotube with single-wall zigzag structure.

The agents that are used to reinforce concrete are carbon nanostructures known as nanotubes, which are generally cylindrical structures of multiple concentric layers disposed by tube-form graphene walls or nets (carbon hexagonal nets) (FIG. 1). The carbon atoms within these graphene cylinders are strongly linked by covalent binding. It is to be noticed that the carbon-carbon binding is one of the most resistant or strength-enhancing that exists in nature. However, some of the carbon atoms in the hexagonal nets can be replaced by other elements or functional groups inasmuch as these tubes more reactive and their interactions with different matrixes are greater. Within the groups or elements that can replace carbon atoms can be listed N, P, O, S, Si, B, Se, etc, or any functional group —OH, —OOH, or OH.

Figure 2:
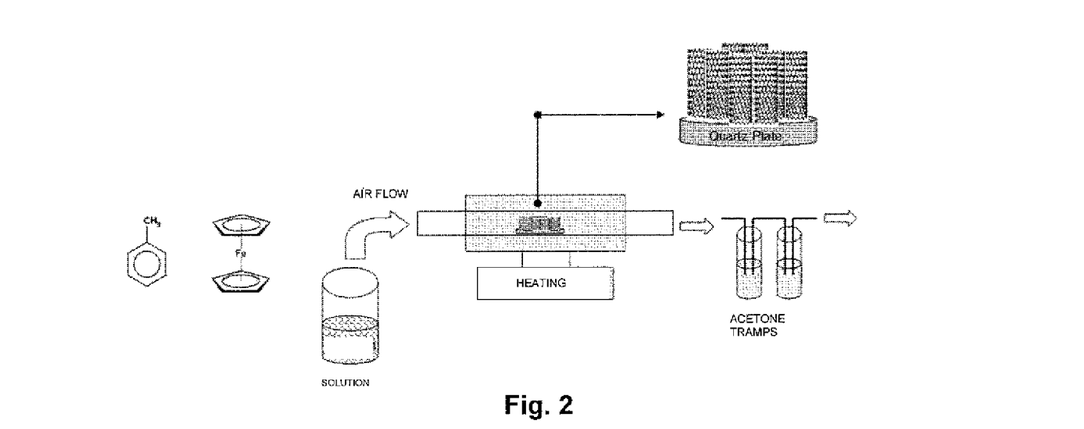
FIG. 2 is a diagram of the synthesis process for the synthesis of carbon nanotubes, using chemical vapor deposition assisted by spraying (AACVD), and of the packed growing of nanotubes.

The dimensions of multiple layer carbon nanotubes used in this invention have a mean length of 300 µm and diameters of 30-70 nm, and were synthesized by the AACVD method (Aerosol Assisted Chemical Vapor Deposition), which uses a solution containing carbon source and a catalyst responsible for growing (e.g. transition metals such as Ni, Fe and Co). This solution is ultrasonic-processed in order to generate an aerosol (FIG. 2), and by means of an inert gas it is transported through a quartz tube to high temperature reactors wherein the growing of nanotubes occurs.

Figure 3A:
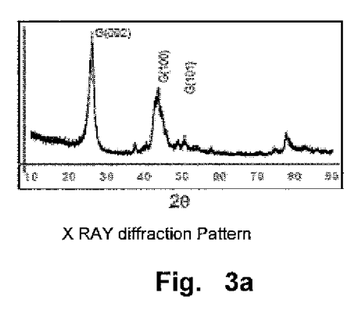
FIG. 3a is an X-ray diffraction pattern of nanotubes.
Figure 3B:
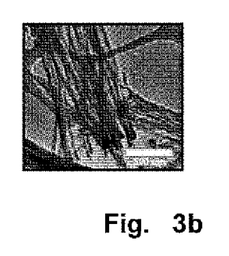
FIG. 3b is an image showing crystallinity of nanotubes.
Figure 3C:
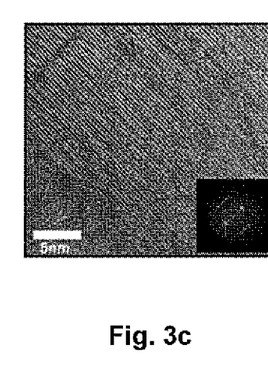
FIG. 3c is a high-resolution transmission electron microscope image of nanotubes.

Other important features of nanotubes of the instant invention are:
   Reactivity, caused by doping or functional groups, which allows a geater interaction between carbon nanotube and the matrix in question to manufacture the nanocompound.
   Excellent crystallinity degree of nanotubes (FIG. 3b).
   Excellent purity of nanotubes that can be observed in FIG. 3a, FIG. 3b and FIG. 3c.

EXAMPLE

The Portland cement used in this example of the invention is formed by the following oxides according to the list shown below:
   64% calcium oxide,
   21% silicon oxide,
   5.5% aluminium oxide,
   4.5% iron oxide
   2.4% magnesium oxide
   1.6% sulfates
1% other materials, mainly water.

Figure 4:
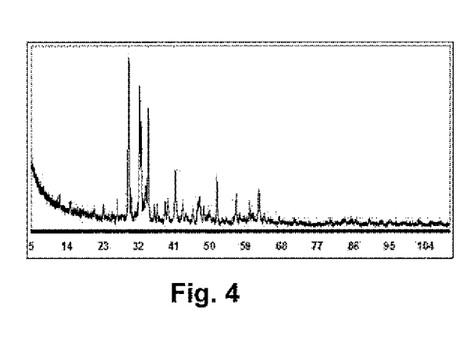
FIG. 4 is a graphic performed by electronic scanning for Portland cement.
Figure 5A:
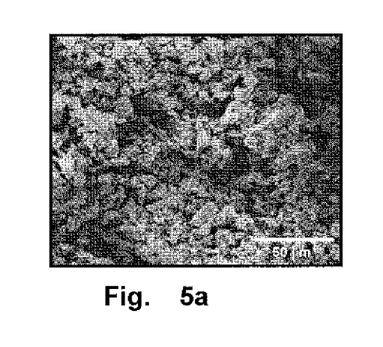
FIG. 5a, FIG. 5b and FIG. 5c are scanning electron microscope micrographs illustrating morphology of grey or Portland cement, as well as the particle size, ranging from 1 µm to 15 µm.
Figure 5B:
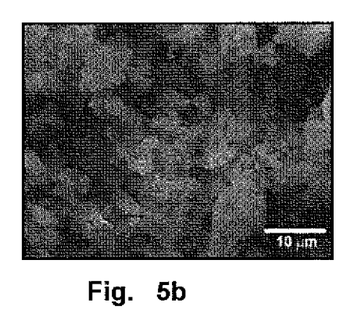
Figure 5C:
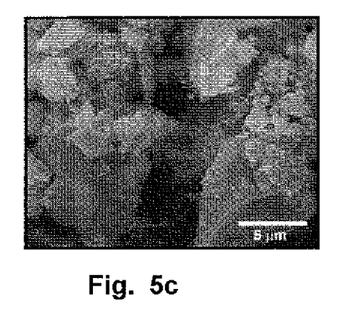

In order to characterize Portland cement used in our experiments of this Example, a previous trial of the particle size using scanning electron microscope (FIG. 4), as well as an analysis of the material chemical composition, using X-ray energetic dispersion technique (EDX) were carried out. In FIGS. 5a-5c micrographs of scanning electron microscope are shown, illustrating morphology of grey or Portland cement in different resolutions as well as particle size from 1 µm to 15 µm.

| Element | % by weight | % AT |
| --- | --- | --- |
| Ca | 39.45 | 22.21 |
| O | 35.43 | 49.96 |
| C | 8.3 | 15.59 |
| Si | 6.47 | 5.2 |
| S | 4.19 | 2.95 |
| Al | 2.07 | 1.73 |
| Fe | 1.97 | 0.8 |
| K | 1.15 | 0.66 |
| Mg | 0.97 | 0.9 |

Figure 6:
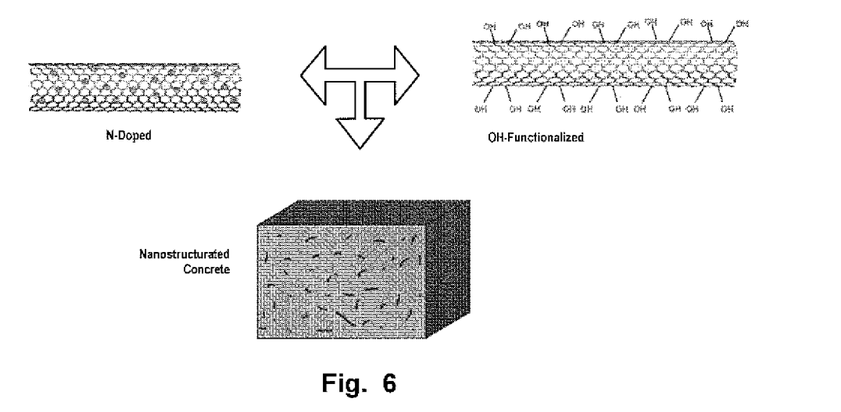
FIG. 6 is a schematic illustration showing the addition concept of two types of nanotubes to cement to obtain the new nanostructured compound material.

The aim of this invention is the study of utilization of mechanical properties of doped and functionalized carbon nanotubes and in order to increase mechanical properties of concrete using minimal amounts of nanotubes. The key of this invention is related to the interaction of active sites on the nanostructure surface (doping), that is using carbon nanotubes with doped external walls (carbon atom substituted by atoms of other elements; FIG. 6) as well as having surface functional groups (functionalized with chemical groups with those above mentioned; FIG. 6), taking advantage of aspect ratio (length/diameter) of carbon nanotubes, aspect ratio unique with regard to other materials used as aggregated before, the nanotube aspect ratios used ranging from 30,000 to 50,000.

Nanotube Dispersion in a Suitable Medium

In concretes, the concrete-water mixture defines its mechanical strength. Therefore, it is possible to perform the mixing of nanotubes in two ways: a) dispersing them in cement, or b) dispersing them in water and afterwards in cement. Since dispersions in cement are less feasible due to the consistency of material when manufacturing, the most convenient is to carry out homogenous dispersions of nanotubes in water that will be added later to cement.

Figure 7A:
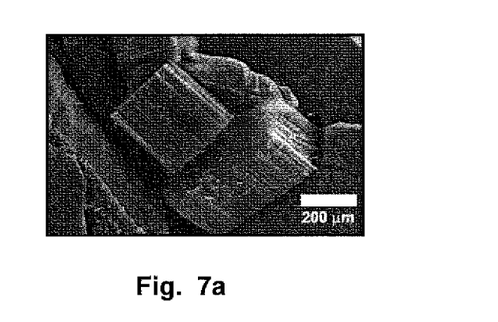
FIG. 7a is a micrograph obtained by a scanning electron microscope, wherein aligned packing of doped carbon nanotubes with functional OH groups is shown.
Figure 7B:
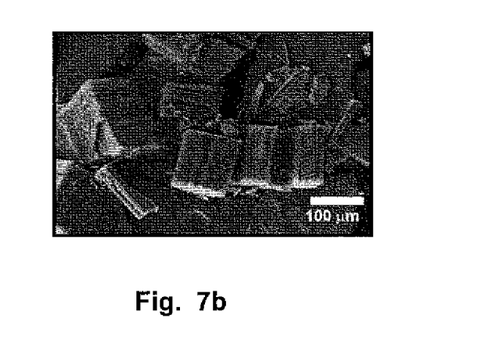
FIG. 7b is a micrograph obtained by a scanning electron microscope, wherein the aligned packing of nanotubes doped with nitrogen is shown.

Initially the nanotubes are disposed in aligned arrangements such as bundles and these arrangements in general are hydrophobic, making difficult a homogeneous dispersion in the medium. Due to this reason, it is important to use a surface active agent or surfactant in order to carry out homogeneous dispersions of nanotubes, thus obtaining the suitable medium for the preparation of reinforced concrete with carbon nanotubes. In FIGS. 7a and 7b there is shown the aligned packing of carbon nanotubes doped with functional groups and doped with nitrogen respectively.

Figure 8A:
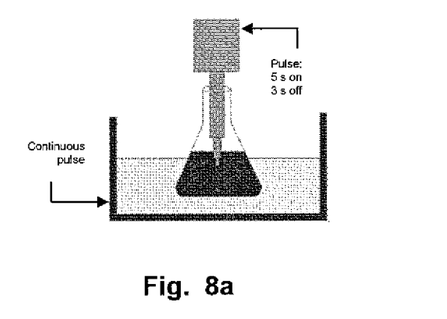
FIG. 8a a is a schematic illustration of simultaneous ultrasonic dispersion process.
Figure 8B:
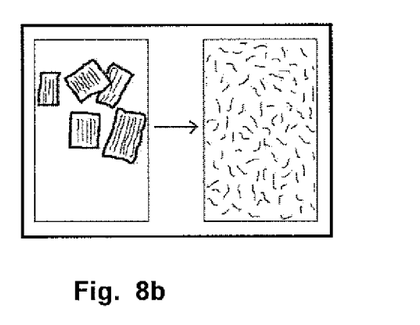
FIG. 8b is a schematic illustration of the effect the surfactant agent causes on the carbon nanotube packages and the aqueous media, which is translated in an homogeneous dispersion, further compatible for manufacturing the subject concrete mixture.

For preparing dispersions in cases of doped and/or functionalized multiple-wall carbon nanotubes, different rates based on the weight percentage of nanotubes with respect to cement weight to be used for manufacturing the mixture in question were used. In particular, an Erlenmeyer flask containing a usual surfactant (liquid detergent with pH 9, also it is possible using SDS or other type of surfactant) in water at 0.3% with respect to water volume (FIG. 8). Afterwards, a process of dispersion was used, by immersing the flask in an ultrasonic bath (using an electroacustic transducer of 42 kHz in a 30-minute continuous cycle) and simultaneously disposing within the flask an ultrasonic point of 500 watts with sonication pulses of 5 minutes and 3 minutes of stop. In FIG. 8b, the effect caused by the surfactant on the carbon nanotubes is shown (left side) and the aqueous media, which results in a homogeneous dispersion (right side), further compatible for performing the concrete mixture.

Manufacturing of Control Test Tubes

The experimental design for obtaining nanostructured reinforced concrete, using doped or functionalized carbon nanotubes, comprises the manufacturing of test tubes having dimensions according to ASTM norms (American Society Testing of Materials). Different samples with different doped or functionalized nanotubes concentrations were obtained. For instance, the following weight percentages were used that are indicated with respect to weight of grey or Portland cement: 1.0%, 0.1% and 0.01%.

Figure 9A:
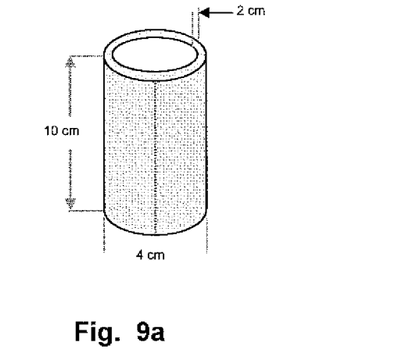
FIG. 9a is a schematic illustration in perspective of the PVC mold used for manufacturing reinforced concrete test tubes.
Figure 9B:
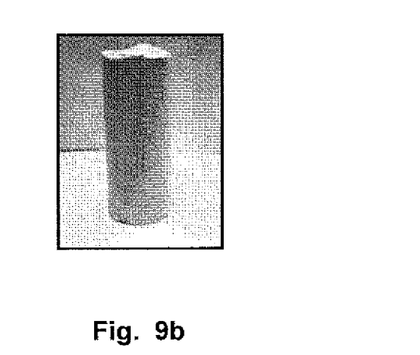
FIG. 9b illustrates a reinforced concrete test tube used in mechanical strength tests.

The mold was obtained from a PVC tube cut in segments of 10 cm in length, in which a cross-cut is effected in order to make easy the extraction of the test tube once the concrete dried and became solid state (FIGS. 9a and 9b).

The experimental results were given statistically by using two test tubes with a mixture of 400 g with grey Portland cement, 200 ml of aqueous solution with 0.3% of surfactant (pH 9).

For mixing doped and functionalized carbon nanotubes, 200 g of grey cement were poured in a plastic container. Afterwards, the aqueous solution was poured slowly (said solution carrying the dispersed carbon nanotubes) mixing manually continuously. Finally, the alkalinity degree is measured, obtaining thus a pH of approximately 12.

Afterwards, molds were placed on a wood plate covered with a plastic film in order to avoid the loss of moisture due to the base solution, and the mixture of cement-nanotubes was poured therein. Upon completing the pouring, a plastic film was placed on the mold top (in order to avoid the excessive loss of moisture).

After 24 hours, the test tubes were extracted from molds such that the test tubes are slipped downwards. The test tube was placed into a plastic container in a brace a little higher than the test tube to be cured for 24 hours.

After the curing time had finished, the test tubes were withdrawn from the liquid media and were placed on a surface, with a moist cloth and superficially dry, the test tubes were cleaned to remove excess water from its surface and tagged according to the type of mixture.

A set of four test tubes was fixed for each mixture type having one control and three test samples. The difference in the series of mixtures is the type of aqueous solution added to cement. Said solution is differenced according to the doped nanotube type that carries, according also to the nanostructure concentration, that ranges from 0.01% to 1.0% by weight of cement.

Figure 10A:
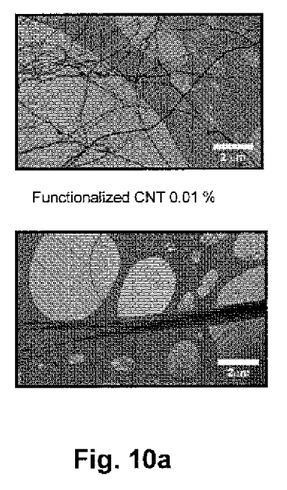
FIG. 10a, FIG. 10b and FIG. 10c show micrographs of dispersion with nanotubes in different percentages; in the lower part of each figure there is a image in great detail of the same sample.
Figure 10B:
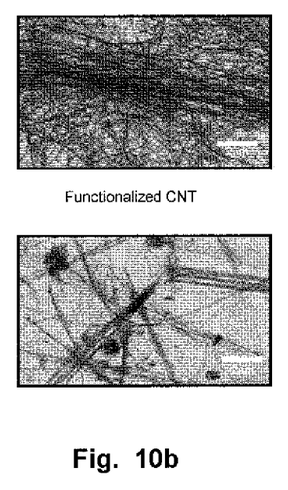
Figure 10C:
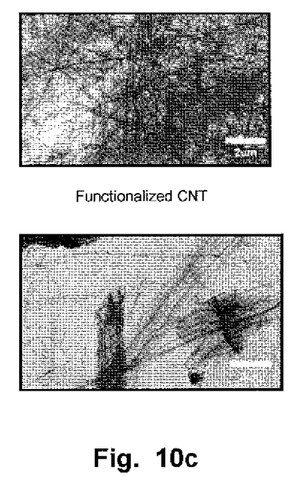
Figure 11A:
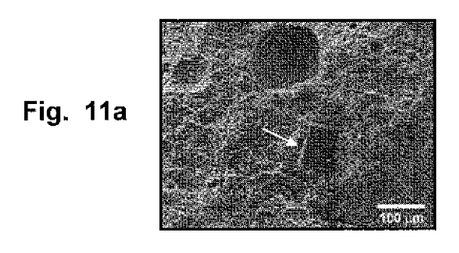
FIG. 11a, FIG. 11b, FIG. 11c and FIG. 11d show nanotube blocks dispersed and catalyzed nanometric structures.
Figure 11B:
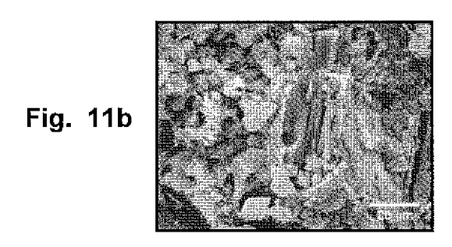
Figure 11C:
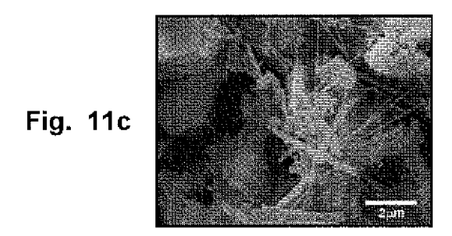
Figure 11D:
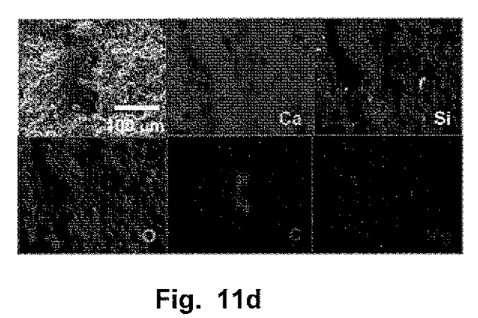

It is important to mention that during preparation of aqueous solutions with carbon nanotubes, it was observed that for percentages from 0.01% to 0.1% by weight, the dispersions are very homogeneous and practically no nanotube conglomerates are observed (FIGS. 10a and 10b), contrary to the rest of concentrations wherein lumps and conglomerated appeared. For percentages of 1% by weight of doped or functionalized nanotubes, the aqueous solution was highly saturated: 4 g of carbon nanotubes in 200 ml of water plus 0.3% of surfactant (FIG. 10c). The phenomenon of extreme viscosity was observed after about 5 minutes from initiation of the dispersion process and therefore the solution was increasingly becoming more viscous, thus reducing the cavitation effectiveness, which resulted in some sites with carbon nanotube packages, especially nitrogen-doped carbon nanotubes.

The test tubes were compressed to rupture by simple compression using a 120 ton capacity hydraulic press, all test tubes were deposited on and covered with neoprene-coated steel plates (press accessories) to standardizing the strength applied to the cross-section of the cylinder, resulting in each case in a associated compression to each test tube.

| Mixture | Description |
| --- | --- |
| 2 | White cement + Water without forging |
| 3 | Grey cement + (Water, additive)[4, 1] |
| 4 | White cement + (Water, additive) [4, 1] |
| 5 | Grey cement + (Water, 0.3% Surfactant) |
| 6 | Grey cement + (Water, 0.3% Surfactant) + [0.01% wt]MWCNT__NX |
| 7 | Grey cement + (Water, 0.3% Surfactant) + [0.1% wt]MWCNT__NX |
| 8 | Grey cement + (Water, 0.3% Surfactant) + [0.01% wt]MWCNT__OX |
| 9 | Grey cement + (Water, 0.3% Surfactant) + [0.1% wt]MWCNT__OX |
| 11 | Grey cement + (Water, 0.3% Surfactant) + [1.0% wt]MWCNT__NX |
| 12 | Grey cement + (Water, 0.3% Surfactant) + [1.0% wt]MWCNT__OX |
| 13 | White cement + {(Resin, Additive)[2, 1]} + (0.1% wt__resin)MWCNT__OX |
| 14 | Grey cement + Water + ({(Resin, Additive)[2, 1]} + (0.1% wt__resin)MWCNT__OX) |
| 17 | Grey cement + Water + {(Resin, Additive)[2, 1]}3, 1 |

-continued

| Mixture | # | D [cm] | H [cm] | A [cm2] | V [cm3] | P [g] | ρ [g/cm3] | Pu [kg] | σ [kg/cm2] | σ [MPa] |
|---|---|---|---|---|---|---|---|---|---|---|
| 2 | 1 | 3.8 | 9.2 | 11.34 | 104.34 | 179 | 1.72 | 900 | 76.36 | 7.78 |
|  | 2 | 3.9 | 9.5 | 11.95 | 113.49 | 179 | 1.58 | 1800 | 150.68 | 14.78 |
|  | 3 | 3.9 | 9.5 | 11.95 | 113.49 | 185 | 1.63 | 1200 | 100.45 | 9.85 |
|  | 4 | 3.9 | 9 | 11.95 | 107.51 | 167 | 1.55 | 1200 | 100.45 | 9.85 |
| 3 | 1 | 3.8 | 9.6 | 11.34 | 108.88 | 184 | 1.69 | 2200 | 193.98 | 19.03 |
|  | 2 | 3.8 | 9.6 | 11.34 | 108.88 | 181 | 1.66 | 4400 | 387.97 | 38.06 |
| 4 | 1 | 3.8 | 8.5 | 11.34 | 96.40 | 144 | 1.49 | 3000 | 264.52 | 25.95 |
|  | 2 | 3.8 | 9.6 | 11.34 | 108.88 | 155 | 1.42 | 2200 | 193.98 | 19.03 |
|  | 3 | 3.8 | 9.7 | 11.34 | 110.01 | 159 | 1.45 | 2000 | 176.35 | 17.30 |
| 5 | 1 | 3.9 | 9.5 | 11.95 | 113.49 | 181 | 1.59 | 2000 | 167.42 | 16.42 |
|  | 2 | 3.9 | 9.5 | 11.95 | 113.49 | 174 | 1.53 | 1800 | 150.68 | 14.78 |
| 6 | 1 | 3.8 | 9.6 | 11.34 | 108.88 | 184 | 1.69 | 3800 | 335.06 | 32.87 |
|  | 2 | 3.8 | 9.6 | 11.34 | 108.88 | 184 | 1.69 | 2200 | 193.98 | 19.03 |
| 7 | 1 | 3.8 | 9.4 | 11.34 | 106.61 | 173 | 1.62 | 3000 | 264.52 | 25.95 |
|  | 2 | 3.8 | 9.4 | 11.34 | 106.61 | 175 | 1.64 | 3800 | 335.06 | 32.87 |
|  | 3 | 3.8 | 9 | 11.34 | 102.07 | 166 | 1.63 | 2200 | 193.98 | 19.03 |
| 8 | 1 | 3.9 | 8.4 | 11.95 | 100.35 | 154 | 1.53 | 2400 | 200.91 | 19.71 |
|  | 2 | 3.9 | 9.3 | 11.95 | 111.10 | 174 | 1.57 | 3200 | 267.87 | 26.28 |
|  | 3 | 3.9 | 9.4 | 11.95 | 112.29 | 173 | 1.54 | 3400 | 284.62 | 27.92 |
| 9 | 1 | 3.9 | 8.8 | 11.95 | 105.12 | 164 | 1.56 | 1400 | 117.19 | 11.50 |
|  | 2 | 3.9 | 9 | 11.95 | 107.51 | 162 | 1.51 | 1000 | 83.71 | 8.21 |
|  | 3 | 3.9 | 8.8 | 11.95 | 105.12 | 155 | 1.47 | 1800 | 150.68 | 14.78 |
| 11 | 1 | 3.9 | 9.3 | 11.95 | 110.10 | 158 | 1.42 | 1400 | 117.19 | 11.50 |
|  | 2 | 3.8 | 8.9 | 11.34 | 100.94 | 147 | 146 | 2800 | 246.89 | 24.22 |
|  | 3 | 3.8 | 8.9 | 11.34 | 100.94 | 148 | 1.47 | 1200 | 105.81 | 10.38 |
| 12 | 1 | 3.8 | 8.8 | 11.34 | 99.80 | 144 | 1.44 | 1100 | 96.99 | 9.51 |
|  | 2 | 3.8 | 8.9 | 11.34 | 100.94 | 144 | 1.43 | 1000 | 88.17 | 8.65 |
|  | 3 | 8.9 | 8.6 | 11.95 | 102.73 | 144 | 1.40 | 900 | 75.34 | 7.39 |
| 13 | 1 | 3.8 | 9.4 | 11.34 | 106.61 | 181 | 1.70 | 4000 | 352.70 | 34.60 |
|  | 2 | 3.8 | 9.7 | 11.34 | 110.01 | 190 | 1.73 | 1800 | 158.71 | 15.57 |
| 14 | 1 | 3.8 | 9.7 | 11.34 | 110.01 | 158 | 1.44 | 1100 | 96.99 | 9.51 |
|  | 2 | 3.9 | 9.3 | 11.95 | 111.10 | 153 | 1.38 | 1000 | 83.71 | 8.21 |
| 17 | 1 | 4 | 10 | 12.57 | 125.66 | 194 | 1.54 | 900 | 71.62 | 7.03 |
|  | 2 | 3.9 | 9.5 | 11.95 | 113.49 | 183 | 1.61 | 900 | 75.34 | 7.39 |

Once the reinforced concrete test tubes were subjected to mechanical tests to analyze the compressive strength, important results were obtained. Significant increments in mechanical properties for reinforced test tubes were observed, with percentages of 0.01% of nitrogen-doped carbon nanotubes, as well as the dispersion of nanostructures in the concrete matrix was observed (FIGS. 11a-11d).

In images shown in FIGS. 11a-11d there can be seen nanotube blocks that were not totally dispersed in some cases and also crystalline forms that can be a reaction product between cement and water and the doped carbon nanotubes. The form in which nanotubes catalyze on their active surface crystalline structures allows us to deduct a suitable behavior pattern between the two structures, phenomena that probably cause the improvement of mechanical properties of concrete.

The present invention has been disclosed in its preferred embodiment, however, it is evident for those skilled in the art, that multiple changes and modifications on this invention can be made without go beyond the scope of the following claims.

The invention claimed is:

1. A reinforced concrete, characterized by comprising:
a cement and a dispersion including water, a surfactant, multilayer carbon nanotubes wherein the carbon atoms in their external walls are substituted by atoms of at least one other element and multilayer carbon nanotubes including chemical groups on their surface.

2. The reinforced concrete according to claim 1, characterized in that the cement is Portland cement.

3. The reinforced concrete according to claim 1, characterized in that the other element is selected from the group consisting of nitrogen, hydrogen, phosphorus, oxygen, sulfur, silicon, selenium and boron.

4. The reinforced concrete according to claim 1, characterized in that the chemical groups are selected from the group consisting of carbonyl group and carboxyl group.

5. The reinforced concrete according to claim 3, characterized of that the chemical groups are selected from the group consisting in carbonyl group and carboxyl group.

6. The reinforced concrete according to claim 1, characterized in that the carbon nanotubes are of generally cylindrical structure.

7. A method for reinforcing concrete, comprising the steps of:
forming a dispersion of surfactant, multilayer carbon nanotubes wherein carbon atoms in their external walls are substituted by atoms of at least one other element and multilayer carbon nanotubes having chemical groups on their surface; and
mixing the dispersion with cement to form a reinforced concrete.

8. The method for reinforcing concrete according to claim 7, characterized in that cement is Portland cement.

9. The method for reinforcing concrete according to claim 7, characterized in that the other element is selected from the group consisting of nitrogen, hydrogen, phosphorus, oxygen, sulfur, silicon, selenium and boron.

10. The method for reinforcing concrete according to claim 7, characterized in that chemical groups are selected from the group consisting of carbonyl group and carboxyl group.

11. The method for reinforcing concrete according to claim 7, characterized in that the dispersion is carried out by sonication.

12. The method for reinforcing concrete according to claim 7, characterized in that the carbon nanotubes are multiple-wall carbon nanotubes.

13. The method for reinforcing concrete according to claim 7, characterized in that carbon nanotubes are of generally cylindrical structure.

* * * * *